United States Patent [19]

Cull

[11] 4,303,625
[45] Dec. 1, 1981

[54] TREATMENT OF REDUCING GAS FOR SUPPRESSION OF CORROSIVENESS

[75] Inventor: Neville L. Cull, Baker, La.

[73] Assignee: Exxon Research & Engineering Co., Florham Park, N.J.

[21] Appl. No.: 879,269

[22] Filed: Feb. 21, 1978

[51] Int. Cl.³ ............................................. B01D 53/36
[52] U.S. Cl. .............................. 423/213.2; 423/213.5; 423/239; 252/463
[58] Field of Search .................. 423/212, 213.2, 213.5, 423/213.7, 239, 628; 252/463

[56] References Cited

U.S. PATENT DOCUMENTS

| | | | |
|---|---|---|---|
| 1,796,501 | 3/1931 | Berl | 423/DIG. 13 |
| 3,328,286 | 6/1967 | Lawrance | 252/463 |
| 3,444,256 | 5/1969 | Engelhard et al. | 252/463 |
| 3,801,516 | 4/1974 | Juguin et al. | 252/463 |
| 3,953,576 | 4/1976 | Meguerian | 423/213.7 |

FOREIGN PATENT DOCUMENTS 1024518  3/1966  United Kingdom .

OTHER PUBLICATIONS

Meguerian et al., "NO$_x$ Reduction Catalysts for Vehicle Emission Control", SAE Paper 71029, 1971.

*Primary Examiner*—G. O. Peters
*Attorney, Agent, or Firm*—Llewellyn A. Proctor

[57] ABSTRACT

The disclosed invention embodies both catalyst and process. The catalyst is comprised of a Group VIII metal, preferably a noble metal, especially platinum, or copper composited with a low acidity inorganic oxide base, preferably alumina. A bed of the catalyst is contacted at elevated temperature with nitrogen oxide containing gas at net reducing conditions to convert the nitrogen oxide to non-corrosive, innocuous by-products to render the gas useful for reservoir pressure maintenance injection needs. In all embodiments, the base with which the metal, or metals, is composited is one having an acidity ranging from about +6.8 to about +0.8 Ho (Hammet acid function), preferably from about +6.8 to about +1.5 Ho. Inorganic oxide bases, especially alumina, which exhibit a weakly acidic Hammet acidity function, Ho ≧ +0.8, when impregnated with a noble metal, or copper, show a marked improvement in NO$_x$ removal vis-a-vis catalysts prepared by impregnating more strongly acidic aluminas with said metal species.

8 Claims, 1 Drawing Figure

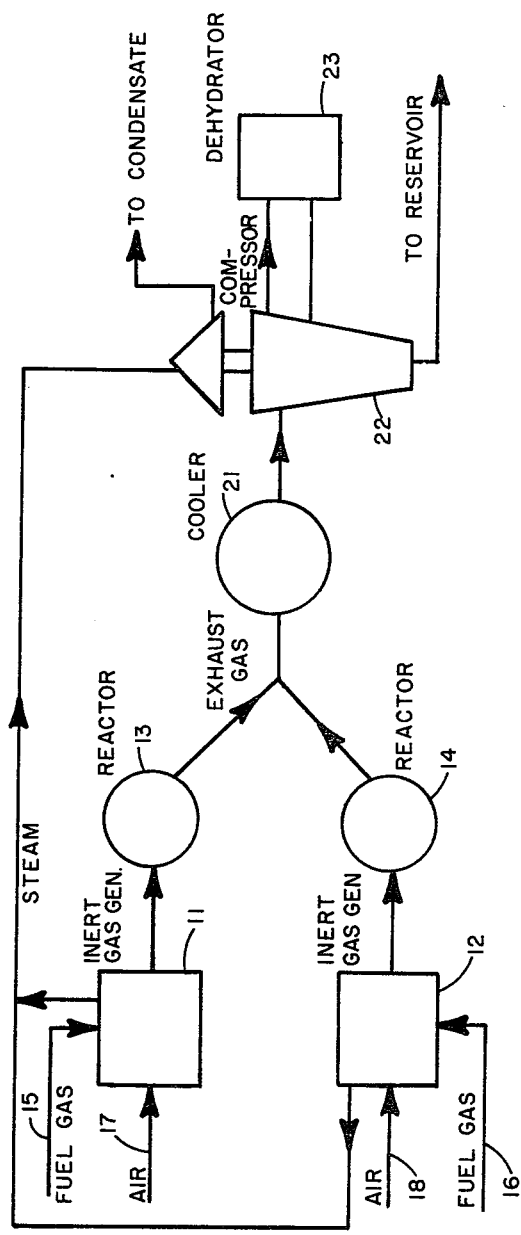
FIGURE

TREATMENT OF REDUCING GAS FOR SUPPRESSION OF CORROSIVENESS

Oil being a fugitive material, natural gas, or other inert gas, is often used as a drive to maximize oil recovery. The gas is injected into a reservoir to maintain cap pressure and thereby prevent, or suppress, movement of oil into the cap. Because natural gas is quite expensive, or in short supply at a site, it has recently become the practice to burn with air a portion of the natural gas recovered from the field as boiler fuel and then to use the steam boiler exhaust gas for reservoir pressure maintenance injection needs. The volume of gas available for reservoir pressure maintenance injection needs is increased approximately nine-fold, and the steam produced in the inert gas generators is used to drive the steam turbines which in turn drive the compressors used to compress the boiler exhaust gas.

A raw boiler exhaust gas, however, contains highly corrosive components which must be removed, or converted into innocuous substances before the gas can be transmitted downstream for compression, and use. Thus, water vapor, carbon dioxide and nitrogen oxides ($NO_x$) are present in the exhaust gas, and both weak carbonic and nitric acids form as the gas is cooled and the water vapor condensed. If untreated, as the boiler flue gas is heated and cooled through several stages of compression, these acids, though relatively harmless at atmospheric pressures, become highly compressed and increasingly concentrated under corrosion rates on equipment becomes entirely unacceptable. Though past attempts to upgrade the raw gas for injection pressure maintenance needs have often met with failure, processes have now been developed wherein the boiler exhaust gas has been rendered substantially innocuous by contact of the raw gas with catalysts at conditions which have converted the corrosive constituents to non-corrosive, harmless by-products.

Catalysts comprised of noble metals, transition metal oxides, and copper supported on alumina are known to be useful for the removal of $NO_x$ from exhaust gases under net reducing conditions, i.e., conditions wherein the concentration of reducing gases present is greater than the combined concentration of oxygen and $NO_x$ present in the gas. Such catalysts, however, do not entirely eliminate these problems, particularly that of excessive corrosion, and further improved catalysts are highly desirable.

It is, accordingly an objective of this invention to meet this, and other needs; and specifically to provide an improved catalyst and process for the pretreatment of $NO_x$-containing gas to render it useful for reservoir pressure maintenance injection needs.

A more particular object is to provide a new and improved catalyst and process for the pretreatment of a boiler fuel exhaust gas to render said gas less corrosive by conversion of the constituents of said gas, under net reducing conditions, to non-corrosive innocuous by-products.

These and other objects are achieved in accordance with the present invention embodying catalyst and process wherein a bed of said catalyst comprised of a Group VIII metal (Periodic Table of the Elements, Sargent-Welch Scientific Company, Copyright 1968), preferably a noble metal, especially platinum, or copper composited with a low acidity inorganic oxide base, preferably alumina, and said bed of catalyst is contacted at elevated temperature with an $NO_x$-containing gas at net reducing conditions to convert the $NO_x$ to non-corrosive, innocuous by-products thereby rendering the gas useful for reservoir pressure maintenance injection needs. In all embodiments, the base with which the metal, or metals, is composited is one having an acidity ranging from about +6.8 to about +0.8 Ho (Hammet acid function), preferably from about +6.8 to about +1.5 Ho, as measured by Hammet indicators.

The acid strength of a solid is thus defined as the ability of the surface to convert an adsorbed neutral base into its conjugate acid (Walling, C. J.A.C.S. 72, 1164 (1950). This acid strength may be expressed by the Hammett acidity function, Ho, which can be written as:

$$Ho = pKa + \log [B]/[BH^+]$$

if the reaction proceeds by proton transfer (Bronsted acidity).

If the reaction proceeds via proton transfer, then for simple basic indicators the following equation can be written, $$B + H^+ \rightleftarrows BH^+$$

where B represents the neutral base and $BH^+$ the conjugate acid.

The acid strength can be expressed as the Hammet acidity function $$HO = -\log aH^+ fB/fBH^+$$

or more commonly as $$Ho = pKa + \log [B]/[BH^+]$$

where $aH^+$ is the proton activity, [B] and [BH+] are the concentrations of the neutral base and its conjugate acid and $fB$ and $fBH^+$ represent the corresponding activity coefficients. A similar expression can be written for Lewis acids where the reaction takes place by means of an electron pair transfer from the adsorbed base to the surface. In this case Ho can be expressed as $$Ho = -\log aA \, fB/fAB$$

or more commonly as $$HO = pKa + \log [B]/[AB]$$

where aA is the activity of the Lewis acid.

A measure of the acid strength of a solid can be obtained from the color of suitable indicators (Hammet indicators). If the color is that of the acid form of the indicator, then the value of the Ho function is equal to or lower than the pKa of the indicator. Lower values of Ho correspond to greater acid strength, and thus the lower the pKa of the indicator the greater the acid strength of the solid.

The measurement of acid strength is accomplished simply by placing a small amount (e.g., 0.2 ml.) of the dry sample in powder form into a small bottle, adding, e.g., 2-3 ml. of isooctane or benzene which contains a small amount of the indicator. After shaking, the color change (if any) is noted. The table below lists some of the commonly used indicators and relates pKa of the indicator to the wt. % $H_2SO_4$ in sulfuric acid solution which has the acid strength corresponding to the respective pKa.

| Indicators | Base-Form | Acid-Form | pKa | [H₂SO₄]* (%) |
|---|---|---|---|---|
| Natural red | Yellow | Red | +6.8 | $8 \times 10^{-8}$ |
| Methyl red | Yellow | Red | +4.8 | — |
| Phenylazonaphthylamine | Yellow | Red | +4.0 | $5 \times 10^{-5}$ |
| p-Dimethylaminoazobenzene (Dimethyl yellow or Butter yellow) | Yellow | Red | +3.3 | $3 \times 10^{-4}$ |
| 2-Amino-5-azotoluene | Yellow | Red | +2.0 | $5 \times 10^{-3}$ |
| Benzeneazodiphenylamine | Yellow | Purple | +1.5 | $2 \times 10^{-2}$ |
| 4-Dimethylaminoazo-1-naphthalene | Yellow | Red | +0.8 | 0.1 |
| p-Nitrobenzeneazo-(p'-nitro)diphenylamine | Orange | Purple | +0.43 | — |
| Dicinnamalacetone | Yellow | Red | −3.0 | 48 |
| Benzalacetophenone | Colorless | Yellow | −5.6 | 71 |
| Anthraquinone | Colorless | Yellow | −8.2 | 90 |

*Wt. % of H₂SO₄ in sulfuric acid solution which has the acid strength corresponding to the respective pKa.

Thermogravimetric techniques which measure the amount of acidity by adsorption of pyridine or lutidine in addition to giving information on acidity also provides an indication of the type of acidity (Bronsted or Lewis) present. [See Benesi, H.; J. Catalyses 28 176 (1973)]. The techniques used to measure acidity by butylamine titration, the definition of Hammet indicators and Hammet acidity function are discussed in "Solid Acids and Bases" by Kozo Tanabe Ch. 2 pp. 5–33, Academic Press, New York, 1970. Both are herewith incorporated by reference.

Pursuant to this invention inorganic oxides bases, especially aluminas, exhibiting a weakly acidic Hammet acidity function, i.e., $H_o \geq +0.8$, preferably $+1.5$, when impregnated with a noble metal, or copper, show a marked improvement in $NO_x$ removal vis-a-vis catalysts prepared by impregnating more strongly acidic aluminas with said metal species. Though the reason, or reasons for this phenomenon are not known, it is possible that the acidity or lack of acidity of the base may affect the bonding of the metal to the support. This may in turn be related to the degree of agglomeration of the metal upon calcination.

It is also probable that the acidity of the support may offset the adsorption characteristics of possible reaction by-products. Thus in the reduction of $NO_x$ with $H_2$ or CO, ammonia is a possible product in addition to nitrogen and $N_2O$. If the alumina is acidic, the ammonia could be more strongly adsorbed and might possibly undergo oxidation to form nitrogen oxides.

Another possibility is that the NO present is oxidized, at least in part, to $NO_2$ catalytically. The $NO_2$, which is an acidic gas, would be expected to be more strongly adsorbed on a basic (or less acid) support and thus subject to reduction by the hydrogen or carbon monoxide present. Moreover, the support may also influence the water gas shift reaction which occurs with CO and $H_2O$ forming $H_2$ and $CO_2$. Also, there is some evidence in the literature that the reaction between hydrogen and nitrogen oxides is faster than carbon monoxide and nitrogen oxides. Since some of the known shift catalysts (iron, copper, etc.) on alumina are promoted by alkalis, it is reasonable to infer that the less acid support materials used for $NO_x$ removal may well be more active shift catalysts than those prepared on more acidic supports.

In any event, what has been discovered is that the catalysts formed with the low acidic base are superior to those formed from the more highly acidic bases; an empirical, and observable fact of high practical value separate and apart from mechanistic views of the reactions which occur.

These and other embodiments of the invention will be better understood by reference to the following more detailed description of the process, and to the attached FIGURE to which reference is made.

Referring to the FIGURE there is disclosed a schematic flow diagram of an inert gas process unit, generally comprised of a plurality of identical trains operating in parallel though, for present purposes only one train is depicted. The process unit generally includes inert gas generators 11, 12 and catalytic reactors 13, 14 operated in parallel. The inert gas generators are preferably steam boilers in which a fuel gas, suitably natural gas from a reservoir (not shown) is introduced via lines 15, 16 and burned with air introduced via lines 17, 18. The highly corrosive $NO_x$-containing gaseous effluent from gas generators, or steam boilers 11, 12, is passed through catalytic reactors 13, 14 and contacted with fixed beds of catalyst contained therein at reaction conditions. The effluent from the catalytic reactors 13, 14 is manifold, passed through the cooler 21 and then introduced into the compressor 22 for compression, condensed liquid being removed from dehydrator 23. Steam produced in steam boilers 11, 12 is used to drive the compressor 22. The compressed non-corrosive gas from the compressor 22 is injected at high pressure into the reservoir.

In the operation of the steam boilers the combustion air is restricted to form a net reducing gas composition, hydrogen and carbon monoxide being formed and maintained in excess of oxygen. It is critical that the amount of carbon monoxide and hydrogen be present in the boiler exhaust gas in excess of the stoichiometric amount necessary to react with both the nitrogen oxides and oxygen present in the boiler exhaust gas. Oxygen must be maintained at a low level and should not exceed about 1 volume percent, and preferably should not exceed about 0.2 volume percent in the boiler exhaust gas.

Operation of the boiler (combustion conditions) to closely control the oxygen content in the exit gas is critical. This is particularly true for nitrogen oxode removal processes based on non-selective reduction, i.e., the use of CO or $H_2$ in the exhaust gas is effective in reducing nitrogen oxides only when the concentration of reducing gases exceeds the amount needed to react with the sum of the oxygen plus the nitrogen oxides present. In other words, the reaction of oxygen with CO or $H_2$ proceeds faster than the reaction of the nitrogen oxides with CO or $H_2$. Since the reaction with oxygen and either hydrogen or CO is strongly exothermic, high concentrations of oxygen can result in high temperatures with deactivation of the catalyst. The conditions of operation of the steam boiler can be readily calculated by techniques well known in the art. In general, about 120.8 M SCF/Hr of natural gas is burned with about 1.2 MM SCF/Hr of air, to generate about 31.4 MM SCF/Day of exhaust gas plus water vapor with the generation of about 85,000 pounds/hr of 800 psi, 800° F. steam.

The boiler exhaust gas is one formed by burning natural gas. A typical exhaust gas composition suitable as feed gas to the catalytic de-NO$_x$ reactor is shown below.

| Component | Volume % |
| --- | --- |
| Nitrogen | 70.4 |
| Carbon dioxide | 9.4 |
| Water | 18.6 |
| Carbon monoxide | 0.8 |
| Hydrogen | 0.6 |
| Oxygen | 0.2 |
| NO$_x$ | 100–200 ppm |

While small variations in composition of the feed gas to the reactors can be tolerated, the oxygen content must be kept at a low value, and the sum of the volume percent of carbon monoxide plus hydrogen must exceed the value defined by 2 X (Vol. % O$_2$+Vol. % NO$_x$).

A catalytic reactor is operated generally at temperatures ranging from about 600° F. to about 900° F., preferably from about 700° F. to about 800° F., at pressures ranging from about 0 psig to about 50 psig, preferably from about 0.5 to about 2.5 psig, and at a gas rate ranging from about 1000 to about 40,000 V/Hr/V, preferably from about 1500 to about 25,000 V/Hr/V dependent on the form, or shape, of the catalyst. In operation at these conditions the concentration of NO$_x$ in the exit gas can be kept below about 10 ppm, and at the preferred conditions of operation within a range of from about 0 to about 2 ppm.

The catalyst can be constituted of various inorganic oxide materials illustrative of which are titania, zirconia, and alumina. Alumina, particularly gamma alumina, is a preferred support with which the metal, or metals, is composited. Suitably, the metal, or metals, is composited therewith by various techniques known to the art. Although the catalyst support, e.g., alumina can be prepared by various methods well known in the literature, care must be exercised to avoid contamination of the alumina with other metal oxides, e.g., silica or with anions such as chloride or sulfate which can contribute to acidity. In general, high purity aluminas are preferred. These can be made from aluminum alkoxides, by interaction of aluminum metal with acetic acid, etc. The temperature of calcination can also affect the acidity exhibited by the alumina so that calcination conditions should be chosen so as to obtain a low acidity support (See Tanabe, Kozo "Solid Acids and Bases," Chapter 4, FIG. 4-1, p. 46, Academic Press. New York, 1970, herewith incorporated by reference).

The same general precautions also apply to supports based on zirconia, titania, thoria, etc. In general preparation from alkoxides results in highly pure and active support materials with low acidity. The metal component, or components, is generally deposited on a previously pilled, pelleted, beaded, extruded, or sieved particulate support material by the impregnation method. Pursuant to the impregnation method, a porous refractory inorganic oxide in dry or solvated state is contacted with a metal or metals-containing solution, or solutions, preferably an aqueous solution, or solutions, and thereby impregnated by a technique embodying absorption from a dilute or concentrated solution, or solutions, with subsequent evaporation to effect total uptake of liquid, or an "incipient wetness" technique which requires a minimum of solution so that the total solution is absorbed, initially or after some evaporation.

The catalyst, as suggested, can be shaped as beads, pellets, tablets, extrudates, and various other shapes. Preferably, however, the catalyst is ring-shaped or shaped as one-half rings because this shape is best for suppression of pluggage due to possible coke formation and to minimize pressure drop across the bed. Alumina Raschig rings of one-half inch diameter, one-eighth inch wall thickness, and of length along its cylindrical axis ranging from about 0.3 to about 0.85 inches, typically 0.5 inch, have been found highly satisfactory in the practice of this invention. Suitably, when rings are employed the gas velocity through the reactor ranges from about 1500 to about 5000 V/Hr/V, preferably from about 2500 to about 3500 V/Hr/V. When the catalyst is shaped as extrudates, the gas space velocity generally ranges from about 5000 to about 20,000 V/Hr/V, preferably from about 7500 to about 10,000 V/Hr/V.

The metallic component of the catalyst, or component composited with the support, is comprised of a Group VIII metal, suitably an iron group metal such as iron, or a platinum group metal such as ruthenium, rhodium, palladium, osmium, iridium, particularly platinum, or copper. The iron group metal, and copper, is usually present in amount ranging from about 2 to about 10 percent, preferably from about 4 to about 7 percent. The noble metal is usually present in amounts ranging from about 0.05 to about 1.0 percent, preferably from about 0.1 to about 0.3 percent, expressed as metallic metal based on the weight of total catalyst. The activity of catalysts formed from these metals vary to some extent and for this reason the optimum concentrations of the metal, and temperature and condition of operation vary to some extent. Generally optimum conditions for catalysts formed from alumina and certain selected metals and temperature of operation of the catalytic process using these catalysts are thus given as follows:

| | Base Metals | | Noble Metals | |
| --- | --- | --- | --- | --- |
| | Cu | Fe | Pt | Ru |
| Typical | 2–10 | 5–10 | 0.05–1.0 | 0.05–0.5 |
| Preferred | 4–6 | 5–7 | 0.1–0.3 | 0.15–0.25 |
| Typical Temp., °F. | 500–800 | 750–950 | 600–900 | 600–900 |
| Preferred Temp., °F. | 600–700 | 800–900 | 700–800 | 700–800 |

The surface area of the catalysts ranges generally from about 40 to about 250 m$^2$/g, preferably from about 50 to about 200 m$^2$/g, as measured by nitrogen adsorption (B.E.T.). In compositing the metal with the carrier, essentially any soluble compound can be used, but a soluble compound which can be easily subjected to thermal decomposition is preferred, e.g., inorganic salts such as halide, nitrate, inorganic complex compounds, or organic salts such as metal acetylacetonetics, amine salts, and the like. Where, e.g., the Group VIII metal is a noble metal such as platinum, platinum chloride, platinum nitrate, chloroplatinic acid, ammonium chloroplatinate, platinum polyamine, platinum acetylacetonate, and the like, can be used.

The impregnation solution of the metal compound is prepared by dissolving the compounds in water or any other inorganic or organic solvent. The impregnation of the metal, or metals, component and into a carrier is carried out by impregnating the carrier with the solution, or solutions of the respective metal compounds by various techniques known in the art. The amount of impregnation solution used should be sufficient to immerse the support, or carrier, the precise volume of the solution depending on the metal concentration in the impregnation solution. The impregnation treatment can be carried out under a wide range of conditions including ambient or elevated temperatures and atmospheric or supratmospheric pressures. The metal, or metals, component can be dispersed on the carrier by such impregnation methods as the simultaneous impregnation of two or more metals using the same impregnation solution, or by sequential impregnation of the metals components. After impregnation the catalyst is dried by heating at a temperature ranging above about 175° F., preferably between about 175° F. and 300° F. in an air atmosphere, and the catalyst then calcined at a temperature between about 300° F. and 1450° F., preferably about 750° F. to 1500° F. for a period of about 3 to 16 hrs.

In a preferred embodiment of the present invention, the support is one comprised of alumina, the total surface acidity which is controlled by the use of highly pure alumina (essentially free of silica or sulfate) which has been calcined at conditions which minimize the presence of strongly acidic sites. For example, an acidity minimum has been shown to occur at 112° F. for aluminas prepared from aluminum isopropoxide.

The invention will be more fully understood by reference to the following non-limiting demonstrations and examples which present comparative data which illustrate its more salient features. All parts are given in terms of weight unless otherwise specified.

EXAMPLE 1

The acidities of four commercially available alumina support materials, designated hereafter as A, B, C and D, were measured using Hammet indicators, the Ho values being shown in Table I.

Portions of each of these aluminas were impregnated with 5 wt. % copper and tested for $NO_x$ removal activity at 700° F., 750° F. and 800° F., respectively. Data were obtained by contact of each of the catalysts with an $NO_x$-containing gas having an approximate composition, as follows: $CO_2$, 9.2%; $O_2$, 0.2%; CO, 0.8%; $H_2$, 0.6%; $H_2O$, 15%; 92 ppm of NO, with the balance of the gas being nitrogen; at a space velocity of about 19,000 V/Hr/V. The results are given in Table I. Analysis for $NO_x$ in the feed and exit gas was determined using a chemiluminescent $NO_x$ analyzer (Beckman Model 951).

TABLE I

Effect of Acidity of $Al_2O_3$ Base on de-$NO_x$ Activity
(5% Cu on $Al_2O_3$ Catalyst, 19,000 SV)

| Alumina Base | A | B[1] | C | D |
|---|---|---|---|---|
| Acidity Ho ≧[2] | +2.2 | +2.2 | −5.6 | −5.6 |
| de-$NO_x$ Activity[3] at | | | | |
| 700° F. | 100 | 99.8 | 10 | (20)[4] |
| 750° F. | 100 | 100 | 9 | 4 |
| 800° F. | 100 | 100 | 3 | 4 |

[1]Sorbent B is a Group II-A metal oxide (MgO) stabilized alumina (0.3% to 0.6% MgO). This sorbent was developed for removal of $SO_2$ from flue gases when it is impregnated with copper. It is a low acidity, open pored structure.
[2]As measured by Hammet indicators.
[3]% $NO_x$ removed.
[4]Not completely lined out.

The data clearly show that the acidity of the alumina base has a marked effect on $NO_x$ removal activity. Similar trends were noted when iron (5%) was impregnated on the above aluminas and the de-$NO_x$ activity measured. A comparison of the acidity as measured by titration with n-butylamine vs. that obtained by pyridine (and 2,6 lutidine) adsorption is shown below.

| Comparison of Titratable Acidity vs. Thermogravimetric Acidity | | | | |
|---|---|---|---|---|
| Alumina Support | A | B | C | D |
| Acidity | | | | |
| Titration (Millimoles/g)[1] | 0.03 | 0.13 | 0.37 | 0.34 |
| Thermogravimetric (Micromoles/g)[2] | 78 | 84 | 103 | 107 |
| Lewis Acidity (Micromoles/g) | 44 | 52 | 76 | 88 |

[1]Titration with n-butylamine using p-dimethylaminoazobenzene indicator, pKa + 3.3.
[2]Pyridine adsorption at 400° C.

Of interest is the fact that the Lewis acidity as measured thermogravimetrically by adsorption of pyridine and 2,6 lutidine shows an inverse correlation with $NO_x$ removal activity. (Pyridine adsorbed reflects total acidity (Bronsted and Lewis) whereas 2,6 lutidine adsorption measures Bronsted acidity (B) so that Lewis acidity (L) is equal to pyridine adsorptions minus 2,6 lutidine adsorption.)

It will be observed that the absolute values differ widely, though this is to be expected since the high temperature study would show only more strongly acidic sites. However, the relative acidity rankings of the aluminas are in substantial agreement. Also, it should be noted that the acidity exhibited by the $Al_2O_3$ base inversely correlates with de-$NO_x$ activity when the aluminas are impregnated with copper.

EXAMPLE 2

To show that the observed differences in de-$NO_x$ activity was not related to physical characteristics (surface area, pore volume, pore size, etc.) of the four alumina supports, samples of these materials were investigated. Data obtained are summarized below.

| Physical Properties of Aluminas Used for de-$NO_x$ Catalyst Supports | | | | |
|---|---|---|---|---|
| Alumina Base | A | B | C | D |
| $N_2$ Adsorption | | | | |
| Surface Area, m²/g | 172 | 265 | 216 | 291 |
| Pore Volume, cc/g | 0.51 | 0.85 | 0.73 | 0.57 |
| Porosity % (Mercury Porosimeter)* | 9.41 | 41.4 | 5.86 | 1.76 |
| Pore Volume, cc/g (Mercury Porosimeter)* | 0.08 | 0.49 | 0.06 | 0.02 |
| Pore Size | Small | Large | Intermed. | Small |

*Up to 12,000 lbs. measures pore volume in pores of 210A diameter and larger while the BET pore volume is a measure of total pore volume.

Supports A, C and D, as will be observed, have only a small fraction of their total pore volume in pores with pore diameters greater than 210 A as measured by the low pressure mercury porosimeter. In contrast Support B has a large fraction of its total pore volume in large pores. Diffusion therefore is not an important limitation. If diffusion limitations were important, differences in activity would be observed between the small pore size Supports A and D vis-a-vis the intermediate pore size Support C and the large pore size Support B. Actual test data on copper catalysts prepared on these aluminas, as previously illustrated, did not show any significant difference in activity between Supports A and B.

EXAMPLE 3

In addition to the physical characteristics of the various aluminas tested as supports, the aluminas were also analyzed chemically for contaminants. Data are summarized below:

| Principal Contaminants in Aluminas Used for de-$NO_x$ Catalyst Studies | | | | |
|---|---|---|---|---|
| Alumina Base | A | B | C | D |
| Contaminant, Wt. % | | | | |
| $SiO_2$ | 0.0 | 0.0 | 0.0 | 2.5 |
| $SO_4$ | 0.0 | 0.0 | 1.8 | 1.8 |
| Na | 0.04 | 0.14 | 0.07 | 0.17 |

The higher purity aluminas when impregnated with copper gave better de-$NO_x$ catalysts.

The principal contaminants, as will be observed, were sulfate and silica. Silica-alumina mixed oxide compositions are well known solid acids as is aluminum sulfate. The higher acidities observed for Supports C and D probably reflect the effect of these contaminants.

EXAMPLE 4

A 5% copper on a high alumina (26%)-silica cracking catalysts was prepared and evaluated for de-NOx activity. The silica-alumina support should be strongly acidic (Ho$\geq -8.2$) and based on past experience such a support should give very poor $NO_x$ conversion. $NO_x$ removal data are summarized below along with a 5% copper on Sorbent B $Al_2O_3$ for comparison.

| $NO_x$ Removal Activity of Copper on Silica-Alumina Support (8 × 10 Mesh Particles 18,000 V/Hr/V Space Velocity) | | |
|---|---|---|
| Catalyst Support | $Al_2O_3$ | $SiO_2—Al_2O_3$ |
| Acidity | Weak | Strongly acidic |
| Wt. % Cu | 5 | 5 |
| % $NO_x$ Removed at | | |
| 700° F. | 100 | 25 |
| 750° F. | 100 | 19 |
| 800° F. | 100 | 17 |

EXAMPLE 5

A de-$NO_x$ catalyst was prepared by impregnation of a zirconia support (Surface Area 27 m²/g, Pore Volume 0.13 cc/g) which showed a Hammet acidity of Ho$\geq +4.0$ (weakly acidic) was inpregnated with 2 wt. % copper and tested for de-$NO_x$ activity. The feed gas composition consisted of 8.8 Vol. % $CO_2$; 0.9 Vol. % $H_2$; 0.15 Vol. % $O_2$; 100 ppm of NO; 9.5 Vol. % $H_2O$, with the balance of the gas being nitrogen. A gas hourly space velocity of 18,500 V/Hr/V was employed at these conditions, 100% $NO_x$ removal being achieved at temperatures of 700° F., 750° F. and 800° F.

EXAMPLE 6

A series of catalysts were prepared by impregnating an 8/10 mesh Sorbent B type alumina (Surface Area 265 m²/g, P.V. 0.82 cc/g) with copper nitrate, ferric nitrate and chloroplatinic acid, respectively, to provide a catalyst containing 5 wt. % copper, 5 wt. % iron and 0.15 wt. % platinum, respectively. The metals were impregnated using the method of incipient wetness. After the impregnations, the iron and copper catalysts were calcined 3 hrs. at 800° F. and the platinum catalyst was calcined for 3 hrs. at 1000° F. The catalysts were each then tested for nitrogen oxide removal activity using a synthetic feed gas consisting of $CO_2$, 9.2 Vol. %; $O_2$, 0.20 Vol. %; CO, 0.8 Vol. %; $H_2$, 0.6 Vol. %; $H_2O$, 15 Vol. % and $NO_x$, 92 ppm; with the balance of the gas being nitrogen. Various gas space velocities were employed. Testing was done using a 5/8 I.D. quartz reactor heated in a sandbath. The gas was passed downflow through the catalyst bed. The $NO_x$ content of the inlet and exit gases was measured using a chemiluminescent analyzer.

Data are shown in the following tabulation.

| Relative de-$NO_x$ Activity of Fe, Cu and Pt Catalysts (Catalytic Support: $Al_2O_3$, 8 × 10 Mesh) | | | | | | |
|---|---|---|---|---|---|---|
| Catalytic Metal | Cu | | Fe | | Pt | |
| Wt. % Metal | 5 | | 5 | | 0.15 | |
| Space Velocity (V/Hr/V) | 4800 | 19000 | 4800 | 19000 | 4800 | 19000 |
| % $NO_x$ Removed @ °F. | | | | | | |
| 700 | 100 | 100 | (77)* | — | 100 | 100 |
| 750 | 100 | 100 | (72)* | 0 | 100 | 100 |
| 800 | 100 | 100 | (98)* | 0 | 100 | 100 |
| 850 | — | — | — | (30)* | — | — |

*The values enclosed in parenthesis denote average values of % $NO_x$ removed over the balance period.

The markedly high activity of the platinum and copper catalysts is readily apparent from these data.

EXAMPLE 7

Although Example 6 clearly shows that the activity of iron (5%) supported on alumina is less than that of copper or platinum, it is possible to effect improvements in the activity of iron catalysts by modification of the alumina with a basic rare earth oxide. $La_2O_3$ has been found particularly effective in promoting the activity of iron.

De-$NO_x$ catalysts were prepared by impregnation of a commercial Sorbent B type alumina (8×10 Mesh) with 5% iron, and by impregnation of an alumina, which had been modified by impregnation with lanthanum nitrate followed by calcination, with 5 wt. % iron and recalcination. The de-$NO_x$ activity of these catalysts was tested in a quartz reactor. The feed gas to the unit had the composition $CO_2$, 9.2 Vol. %; oxygen, 0.2%; NO, 92 ppm; CO, 0.8 Vol. %; $H_2$, 0.6 Vol. %; $H_2O$, 15%; with the balance of the gas being nitrogen. The exit gas was analyzed for NO using a chemiluminescent analyzer. Data are shown below.

| Catalyst Base | $Al_2O_3$ | | 2% La on $Al_2O_3$ | |
|---|---|---|---|---|
| Wt. % Fe | 5 | | 5 | |
| Space Velocity (V/Hr/V) | 9600 | 19000 | 9600 | 19000 |
| % $NO_x$ Removed at | | | | |
| 750° F. | 1 | 0.0 | 48 | 11 |
| 800° F. | 36 | 0.0 | 97 | 31 |
| 850° F. | — | 20.0 | 100 | 51 |

As seen, the lanthanum promoted catalyst showed a much higher $NO_x$ removal, and the activity of the iron catalyst increases with increasing temperature. Modification of the alumina with lanthanum may reduce the acidity of the support with the corresponding increase in activity. A 1% potassium, 5% iron on alumina catalyst, however, showed lower activity then the control.

EXAMPLE 8

An alumina support (alumina 8×10 Mesh) was steamed for 16 hrs. at 1500° F., to provide a support having a surface area of 89 m²/g, a pore volume of 0.70 cc/g and an acidity, measured by Hammet indicators, of Ho$\geq +3.3$. The support was impregnated with Ru (NO₃)₃ to provide 0.2 wt. % Ru on the support. This catalyst was then tested as described in Example 6, showing a 100% $NO_x$ removal at 700° F., 750° F. and 800° F.; an excellent de-$NO_x$ catalyst.

EXAMPLE 9

The temperature stabilities of copper (5% on a commercial Sorbent B type alumina) and platinum (0.27% on a commercial Sorbent B type alumina) were determined. It was found that at 900° F. the platinum catalyst was still removing essentially all, or 100% of the nitrogen oxides. The copper catalyst showed signs of deactivation dropping from 96% removal initially to 64% removal after about 20 hrs. High temperature operations thus prove deleterious to copper catalysts. However, at low temperatures (600° F.) the copper catalyst is very active removing 100% of the $NO_x$.

The platinum catalyst is the preferred catalyst for commercial operations because of the lower activity decline at high temperatures and lower loss in activity with time.

EXAMPLE 10

The following example illustrates the importance of maintaining a "net" reducing atmosphere lying between the 0.85 Vol. % and 0.29 Vol. % reductant level if satisfactory nitrogen oxide removal is to be obtained.

| Effect of Concentration of Reductant on $NO_x$ Removal Activity (5% Cu on Al₂O₃ Catalyst, 4700 V/Hr/V) | | | |
|---|---|---|---|
| Vol. % CO + H₂ Present in Feed Gas | 2.16 | 0.85 | 0.29 |
| Minimum Vol. % Reductant Needed for O₂ + $NO_x$ Present | 0.35 | 0.35 | 0.35 |
| % $NO_x$ Removed at | | | |
| 650 | 100 | 100 | 9 |
| 700 | 100 | 100 | 11 |
| 750 | 100 | 100 | 6 |
| 800 | 100 | 100 | 6 |

EXAMPLE 11

Life tests were conducted in a small reactor using (a) 5% copper on Al₂O₃ ½" Raschig rings and (b) p.15% Pt on Al₂O₃ ½" Raschig rings, respectively. Both of the catalysts tested were prepared using commercially supplied alumina (similar to sorbent B in earlier examples). The catalysts were packed in beds approximately 8.5 inches in depth by 3.0 inches in diameter, and then contacted with a feed blend. All life tests were run at constant operating conditions at about 750° F. gas inlet temperature and 3,000 V/Hr/V. The feed blend used is shown below.

| Boiler Exit Gas Composition (Feed to de-$NO_x$ Reactor) | |
|---|---|
| Component | Vol. % |
| Nitrogen | 70.4 |
| Carbon Dioxide | 9.4 |
| Carbon Monoxide | 0.8 |
| Hydrogen | 0.6 |
| Oxygen | 0.2 |
| Water | 18.6 |
| Nitrogen Oxides | 100 ppm |

The copper on alumina catalyst was tested for approximately 110 days and the platinum catalyst for 125 days. The platinum catalyst during its life test showed no tendency to deactivate. The copper catalyst showed greater sensitivity to temperature variations as shown below.

| Catalyst Temperature Sensitivity (ca. 3000 V/H/V, 122-125 ppm $NO_x$ in Feed) Catalyst Age: Cu - 102 Days; Pt - 118 Days | | | | |
|---|---|---|---|---|
| | Catalyst | | | |
| | 5% Copper | | 0.15% Platinum | |
| Date | Inlet Gas Temp. °F. | $NO_x$ Out (% $NO_x$ Removal) ppm | Inlet Gas Temp. °F. | $NO_x$ Out (% $NO_x$ Removal) ppm |
| 6/8 | 751 | 14.5 (88.4) | 756 | 0.2 (99.8) |
| 6/9 | 800 | 21.0 (82.9) | 810 | 0.2 (99.8) |
| 6/10 | 825 | 16.0 (87.0) | 829 | 0.9 (99.3) |
| 6/11 | 754 | 14.5 (88.0) | 758 | 0.8 (99.4) |
| 6/14 | 754 | 14.0 (88.6) | 765 | 0.7 (99.4) |
| 6/14 | 649 | 9.0 (92.3) | 655 | 0.7 (99.5) |
| 6/15 | 650 | 6.0 (95.2) | 647 | 0.4 (99.7) |

*50-60° F. ΔT across cat bed.

Because of the superior performance of the platinum catalyst, particularly at the higher temperatures (800° F.), the platinum catalyst is preferred. It should be noted that at temperatures as low as 600° F. the copper catalyst has shown excellent $NO_x$ removal. Activity maintenance of the copper catalyst is greatly improved by operations at the lower end of the temperature range.

Inspections on the discharged catalysts after the life test showed no drastic decrease in surface area and only a slight increase in the pore volumes compared with the fresh catalysts. Data are shown below:

| Physical Properties of Discharged catalysts from Aging Tests | | | | |
|---|---|---|---|---|
| | 5% Cu on Al₂O₃ | | 0.15% Pt on Al₂O₃ | |
| Catalyst | Fresh | Discharged[1] | Fresh | Discharged[2] |
| Surface Area, m²/g | 206 | 131 | 198 | 142 |
| Pore Volume, cc/g | 0.50 | 0.56 | 0.50 | 0.58 |

[1] After approximately 116 days of operation.
[2] After approximately 150 days of operation.

EXAMPLES 12

A preferred catalyst is one comprised of 0.15% Pt on alumina Raschig rings (sorbent B type) of 0.5" diameter. Runs with three different composite of these catalysts are summarized below:

| Composite No. | 1 | 2 | 3 |
|---|---|---|---|
| Run No. | 10 | 11 | 12 |
| Reactor No. | 4 | 4 | 4 |
| Avg. Inlet Gas Temp. (°F.) | 758 | 759 | 755 |
| Space Velocity | 3000 | 3000 | 3000 |
| Hrs. on Feed Gas | 172 | 358 | 292 |
| % $NO_x$ Removal | 100 | 99+ | 100 |

It is apparent that various modifications and changes can be made without departing the spirit and scope of the invention.

Having described the invention, what is claimed is:

1. In a process wherein a fuel gas is burned with air to produce an exhaust gas which contains water vapor, carbon dioxide and nitrogen oxides which, when compressed, cooled, and condensed can form highly corrosive carbonic and nitric acids; the improvement comprising contacting said exhaust gas, at net reducing conditions, with a catalyst comprising a Group VIII metal or copper composited with an inorganic oxide base having a Hammet acidity function ranging from about +6.8 Ho to about +1.5 Ho.

2. The process of claim 1 wherein the exhaust gas is formed by burning natural gas.

3. The process of claim 1 wherein the catalyst is one containing a Group VIII noble metal.

4. The process of claim 3 wherein the Group VIII noble metal is platinum.

5. The process of claim 1 wherein the Hammet acidity function of the base ranges from about +6.8 Ho to about +0.8 Ho.

6. The process of claim 1 wherein the inorganic oxide base is alumina.

7. The process of claim 6 wherein the base is ring-shaped.

8. The process of claim 6 wherein the base is shaped as half-rings.

* * * * *